(12) United States Patent
Tan et al.

(10) Patent No.: US 7,249,178 B2
(45) Date of Patent: Jul. 24, 2007

(54) NON-INTRUSIVE RECURSIVE DISPATCHING OF NESTED SERVICE COLLECTIONS FOR AGGREGATING WEB SERVICES

(75) Inventors: Yih-Shin Tan, Raleigh, NC (US); Jie Xing, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 906 days.

(21) Appl. No.: 10/402,409

(22) Filed: Mar. 28, 2003

(65) Prior Publication Data
US 2004/0193713 A1 Sep. 30, 2004

(51) Int. Cl.
*G06F 15/173* (2006.01)
(52) U.S. Cl. ............... 709/225; 709/200; 709/201; 709/202; 709/223; 709/224; 370/285; 370/400; 370/401; 370/402
(58) Field of Classification Search ........... 709/225, 709/200, 201, 202, 223, 224; 370/285, 400, 370/401, 402
See application file for complete search history.

(56) References Cited
U.S. PATENT DOCUMENTS
5,689,644 A * 11/1997 Chou et al. ............. 370/392

| | | | |
|---|---|---|---|
| 6,477,571 B1 * | 11/2002 | Ross | 709/224 |
| 7,061,923 B2 * | 6/2006 | Dugan et al. | 370/396 |
| 2002/0062384 A1 * | 5/2002 | Tso | 709/229 |
| 2002/0105911 A1 * | 8/2002 | Pruthi et al. | 370/241 |
| 2003/0097464 A1 * | 5/2003 | Martinez et al. | 709/238 |
| 2003/0135612 A1 * | 7/2003 | Huntington et al. | 709/224 |
| 2004/0193713 A1 * | 9/2004 | Tan et al. | 709/225 |

* cited by examiner

*Primary Examiner*—Walter Lindsay, Jr.
*Assistant Examiner*—Abdulfattah Mustapha
(74) *Attorney, Agent, or Firm*—Jeanine Ray-Yarletts, Esq.; Steven M. Greenberg, Esq.; Carey Rodriguez Greenberg & Paul LLP

(57) ABSTRACT

The present invention is a method and system for non-intrusively dispatching service requests in a service node nested in a service topology. The method can include receiving a service request in the service node and identifying a requested operation and corresponding parameters for the requested operation from the received service request. A port end point address can be obtained for the requested operation and a service list can be located for the requested operation. It can be determined whether the service node is a destination hub. If so, an operation corresponding to THE service request can be invoked. Otherwise, a service node at a different level in the service topology can be selected and the foregoing process can be recursively performed.

12 Claims, 4 Drawing Sheets

NON-INTRUSIVE RECURSIVE DISPATCHING OF NESTED SERVICE COLLECTIONS FOR AGGREGATING WEB SERVICES

BACKGROUND OF THE INVENTION

1. Statement of the Technical Field

The present invention relates to the field of Web services and more particularly to dispatching service calls to nested services in a nested service collection.

2. Description of the Related Art

Web services have become the rage of distributed computing and are viewed as the foundation for developing a truly universal model for supporting the rapid-development of component-based applications over the World Wide Web. Typically, Web services can be defined by an interface and implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art.

Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols. Conceptually, Web services represent a model in which discrete tasks within e-business processes are distributed widely throughout a value net. Notably, many industry experts consider the service-oriented Web services initiative to be the next evolutionary phase of the Internet.

When Web services are grouped into a single service collection, which further can be grouped into a single service collection of service collections, a nested cluster oriented service intermediary complex can be formed. In the nested cluster oriented service intermediary complex, all external interactions can occur at the top level of the nested hierarchy. The advantage of providing the nested structure can include ease of use, integration, interoperability, and manageability. Nevertheless, the burden imposed upon the intermediary can be significant. Specifically, to route requests for service, the top level must recursively dispatch the request to a target service nested one or more levels below the top level.

In illustration of the difficulties encountered when routing service requests to a nested service, FIG. 1 depicts a nested service collection. The conventional nested service collection can include a top level node 120 coupled to intermediate level nodes 130 and leaf level nodes 140. To route a service request 110 to a suitable level service 140, the request must be routed first to the intermediate level port 130 which can route the request 110 to the selected leaf level port 140 containing the desired service. In the exemplary case shown in FIG. 1, a print request which originally conforms to a "job" interface can be routed by nesting and dispatching logic to a selected port responsible for generic "jobs". Subsequently, the selected port can determine that the "job" is a print request which can be further routed to a selected "Print Shop" port responsible for print jobs. In this regard, the request can be reformatted to conform to the interface specified by the "Print Shop" port.

Notably, in accordance with the nesting logic of FIG. 1, multiple levels of manual function call conversion and dispatching will be required. Furthermore, it will be apparent to the skilled artisan that the nesting logic of FIG. 1 will be dependant upon the static topology illustrated therein. To the extent that the request enters the topology at a level other than the top level, a different interface will be required to call the original service request. More importantly, a reorganization of topology, for instance moving the underlying leaf level port and associated requested service to a different level in the topology will require a complete recoding of the dispatching logic.

SUMMARY OF THE INVENTION

The present invention is a method and system for non-intrusively dispatching service requests in a service node nested in a service topology. The method can include receiving a service request in the service node and identifying a requested operation and corresponding parameters for the requested operation from the received service request. A port end point address can be obtained for the requested operation and a service list can be located for the requested operation. It can be determined whether the service node is a destination hub. If so, an operation corresponding to THE service request can be invoked. Otherwise, a service node at a different level in the service topology can be selected and the foregoing process can be recursively performed.

A service request dispatching system, by comparison, can include a collection of service nodes disposed in a nested service collection topology. A corresponding number of local service policies can be included as well. Each of the local service policies can define a physical port address for a corresponding port type. Accordingly, recursive dispatching logic can be configured to route received service requests to individual ones of the service nodes according to locally specified port addresses. The recursive process can continue until a service node acting as a destination hub for the service request can be identified by the recursive dispatching logic.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a system and method for non-intrusive recursive dispatching of nested service collections for aggregating Web services. Specifically, nesting dispatching logic can be automatically generated for collections of services aggregated in a complex. Additionally, a consistent interface can be maintained to the intended service instance, regardless of where in the topology a service request is received. In accordance with the inventive arrangements, the topology of multiple services and ports in the complex can be flattened into a logical relationship of a single service and ports for invocation. Consequently, a reorganization of the underlying node hierarchy can result in the automatic readjustment of the nested dispatching logic to adapt to the reorganized topology.

As an example, the following WSDL document generated for the top level node 210 can be illustrative of the flattened service ports:

```
<xml version="1.0" encoding="UTF-8"?>
<wsdl:definitions xmlns:wsdl="http://schemas.xmlsoap.org/wsdl/"
    xmlns="http://schemas.xmlsoap.org/wsdl/"
    xmlns:SOAP-ENC="http://schemas.xmlsoap.org/soap/encoding/"
    xmlns:iml="http://CG_Services"
    xmlns:intfh="http://CG_Services-Interface"
    xmlns:intf1="http://CG_portA2-Interface"
    xmlns:intf2="http://CG_portB1-Interface"
    xmlns:intf3="http://CG_portDL1Interface"
    xmlns:wsdlsoap="http://schemas.xmlsoap.org/wsdl/soap/"
    xmlns:xsd="http://www.w3.org/2001/XMLSchema"
    targetNamespace=" ">http://CG_Services">
<wsdl:import location="http://localhost:80/CG/CG_Services_Interface.wsdl"
            namespace="http://CG_Services-Interface"/>
<wsdl:import location="http://localhost:80/CG/CG_portA2_Interface.wsdl"
            namespace="http://CG_portA2-Interface"/>
<wsdl:import location="http://localhost:80/CG/CG_portB1_Interface.wsdl"
            namespace="http://CG_portB1-Interface"/>
<wsdl:import location="http://localhost:80/CG/CG_portDL1_Interface.wsdl"
            namespace="http://CG_portDL1-Interface"/>
<wsdl:service name="CG_Services">
    <wsdl:port binding="intfh:CGservicesBinding" name="CG_Services"/>
        <wsdlsoap:address location="http://localhost:80/CG/services/CG_Services"/>
    </wsdl:port>
    <wsdl:port binding="intf1:portA2SoapBinding" name="CG_portA2"/>
        <wsdlsoap:address location="http://localhost:80/CG/services/CG_portA2"/>
    </wsdl:port>
    <wsdl:port binding="intf2:portB1SoapBinding" name="CG_portB1"/>
        <wsdlsoap:address location="http://localhost:80/CG/services/CG_portB1"/>
    </wsdl:port>
    <wsdl:port binding="intf3:portDL1SoapBinding" name="CG_portDL1"/>
        <wsdlsoap:address location="http://localhost:80/CG/services/CG_portDL1"/>
    </wsdl:port>
</wsdl:service>
</wsdl:definitions>
```

Figure 1:
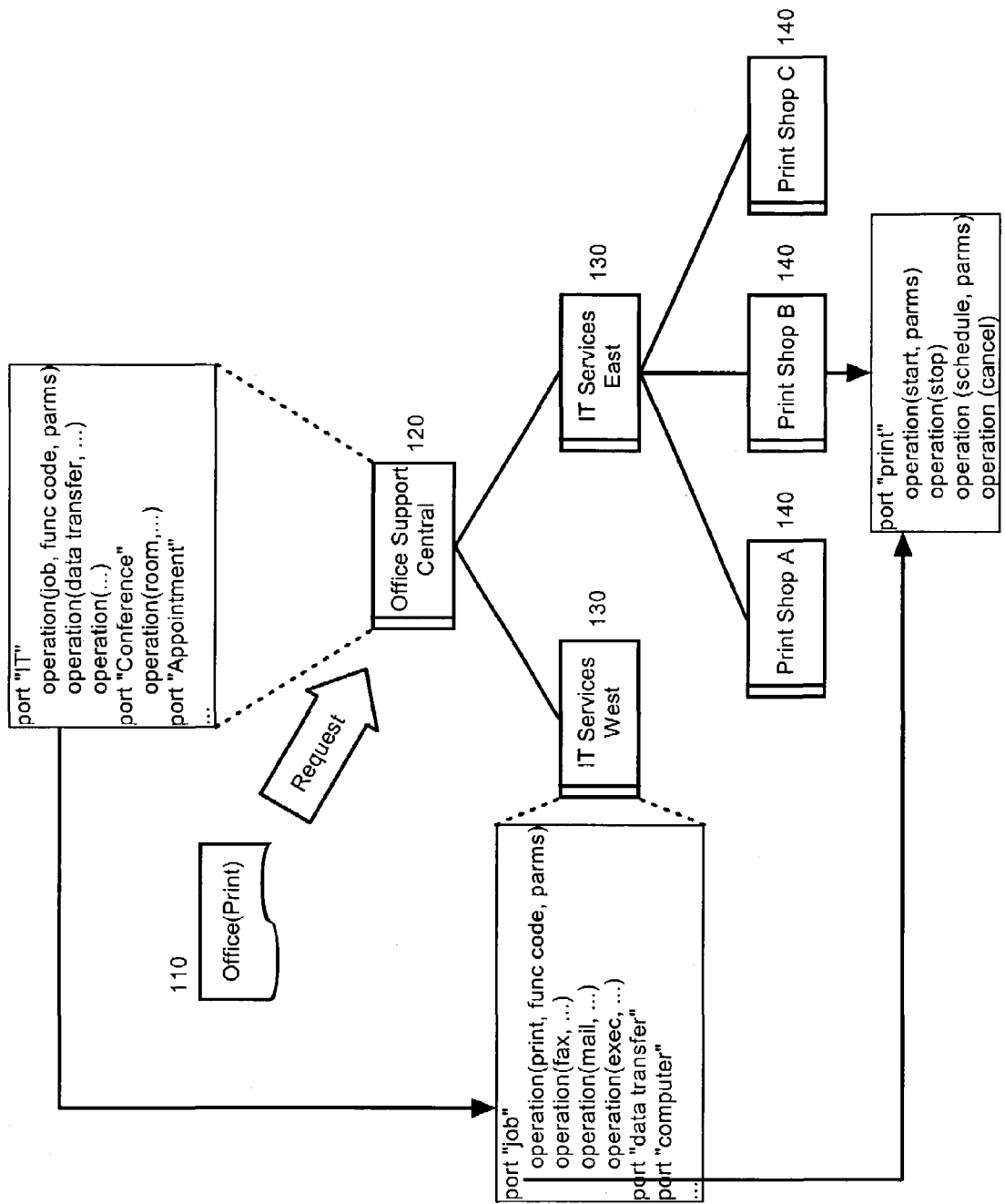
FIG. 1 is a schematic illustration of a nested service collection topology configured for conventional nesting and dispatching logic as is known in the prior art.
Figure 2:
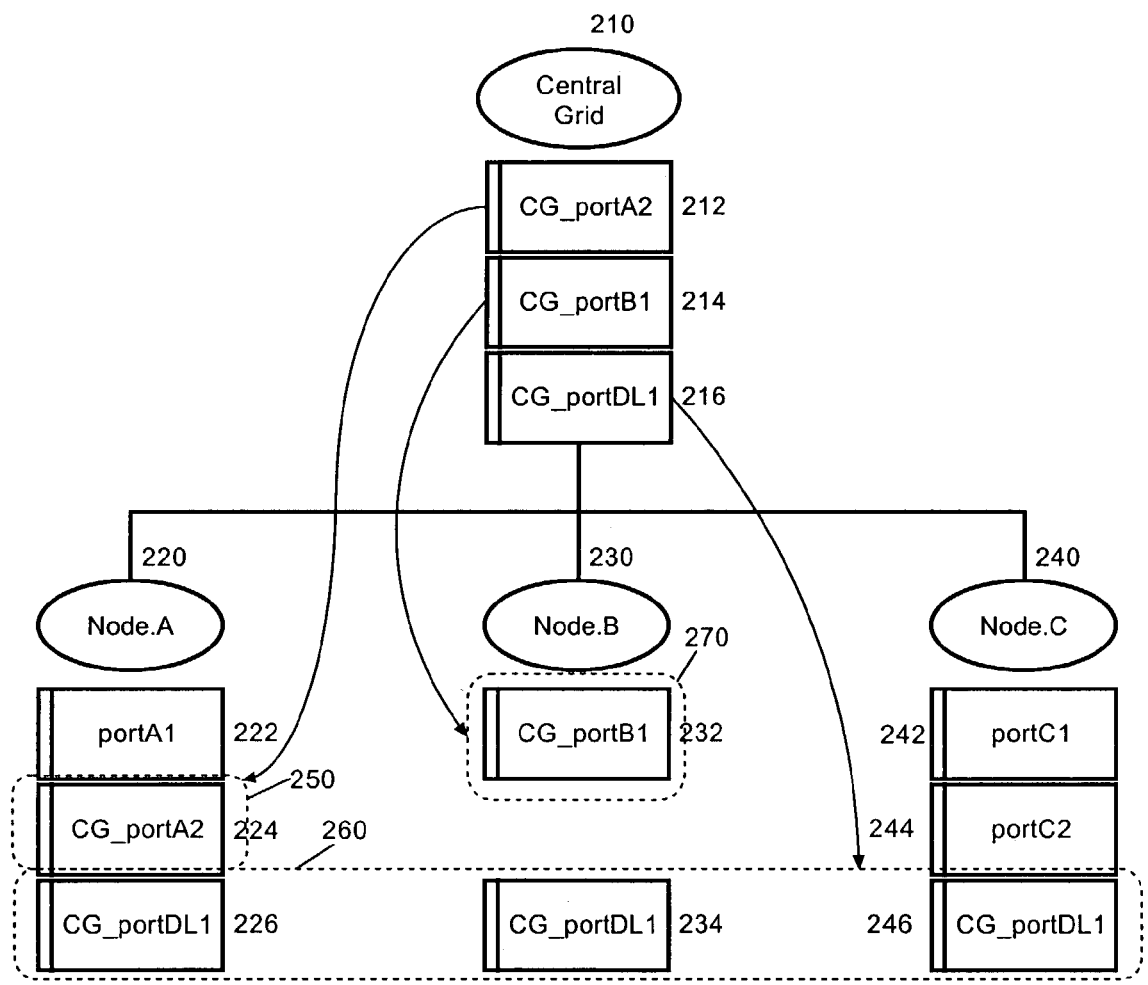
FIG. 2 is a schematic illustration of a flattened nested service topology configured for the non-intrusive recursive nesting and dispatching logic of the present invention.

FIG. 2 is a schematic illustration of a flattened nested service topology configured for the non-intrusive recursive nesting and dispatching logic of the present invention. The exemplary topology can include a physical structuring of nodes 220, 230, 240 under the top level node 210. In this regard, Node A 220 can include the following port types "portA1" 222, "CG_portA2" 224 and "CG_portDL1" 226. Similarly Node B 230 can include the port type "CG_portB1" 232 and the port type "CG_portDL1" 234. Finally, Node C 240 can include the port type "portC1" 242, the port type "portC2" 244, and the port type "CG_portDL1" 246. Each of the port types can be further aggregated from nested node at lower levels, albeit additional nested nodes are not shown in FIG. 2.

Importantly, same port types, regardless of the associated node, can be aggregated by the top level node 210. Accordingly, as illustrated in FIG. 2, the port types "CG_portDL1" 226, 234, 246 can be combined in the aggregation 260 despite the physical association of the port types "CG_portDL1" 226, 234, 246 within different nodes 220, 230, 240. Similarly, the port type "CG_portA2" 224 can be combined in the aggregation 250 and the port type "CG_portB1" 232 can be combined in the aggregation 270. Each of the aggregations 250, 260, 270 can be maintained by port reference 212, 214, 216 in the top level node 210. More particularly, the end point addresses for the flattened service ports can be generated when nodes are registered to upper level nodes. Each address can point to an implicit list of services aggregated from the next level of nodes supporting the port.

It will be apparent to the skilled artisan that the end point address for the port type "CG_portDL1" can be used by "CG_Services" to locate a list of services for a request directed to this port.

Figure 3:
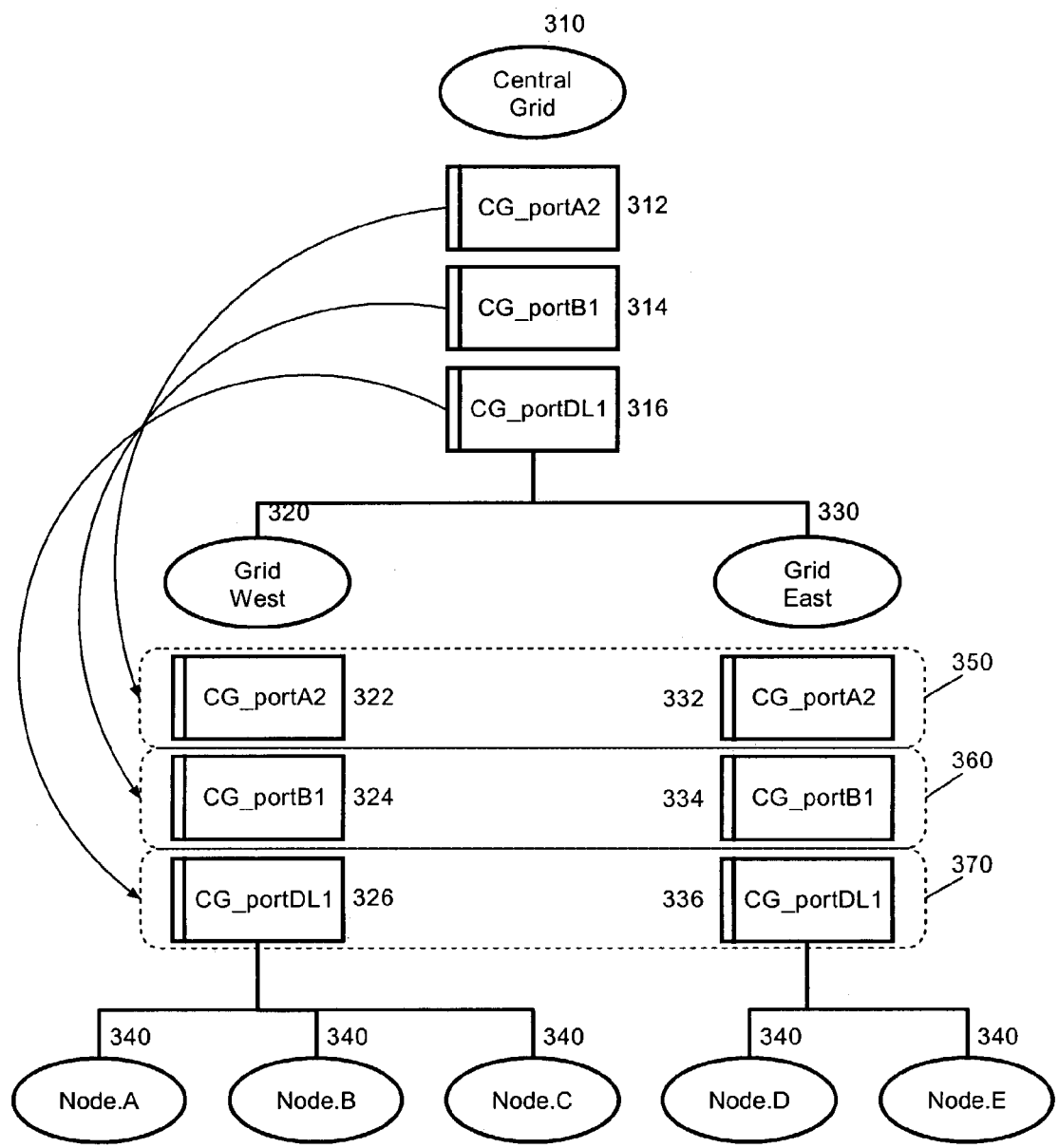
FIG. 3 is a schematic illustration of a modified flattened nested service topology based upon the topology of FIG. 2, which modification will not require a recoding of the dispatching logic of FIG. 2; and, FIG. 4 is a flow chart illustrating a process for non-intrusive nesting and dispatching of service requests in a flattened nested service topology.

FIG. 3 is a schematic illustration of a modified flattened nested service topology based upon the topology of FIG. 2, which modification will not require a recoding of the dispatching logic of FIG. 2. In particular, as shown in FIG. 2, additional nodes 320, 330 can be inserted at a nested level above existing nodes 340 in the actual topology of the service collection. The first inserted node 320 can aggregate the port types 322, 324, 326 from the underlying nodes 340, "Node.A", "Node.B" and "Node.C". Similarly, the second inserted node 330 can aggregate the port types 332, 334, 336 from the underlying nodes 340, "Node.D", "Node.E".

Regardless of the reorganization, however, the top level node 310 can aggregate the port type "CG_portA2" 322, 332 through a single reference 312 to the aggregation 350, the port type "CG_portB1" 324, 334 through a single reference 314 to the aggregation 360, and the port type "CG_portDL1" 326, 336 through a single reference 316 to the aggregation 360. More importantly, the service policy settings of each node can control the recursive dispatching of a request to a node at a lower level until the leaf node can be identified. As the service policy settings are physical to each node, changes in service policy settings can apply transparently and non-intrusively to the logical port listings 312, 314, 316. Also, the interfaces to the ports will not change, notwithstanding the insertion of the intermediate nodes 320, 330.

Figure 4:
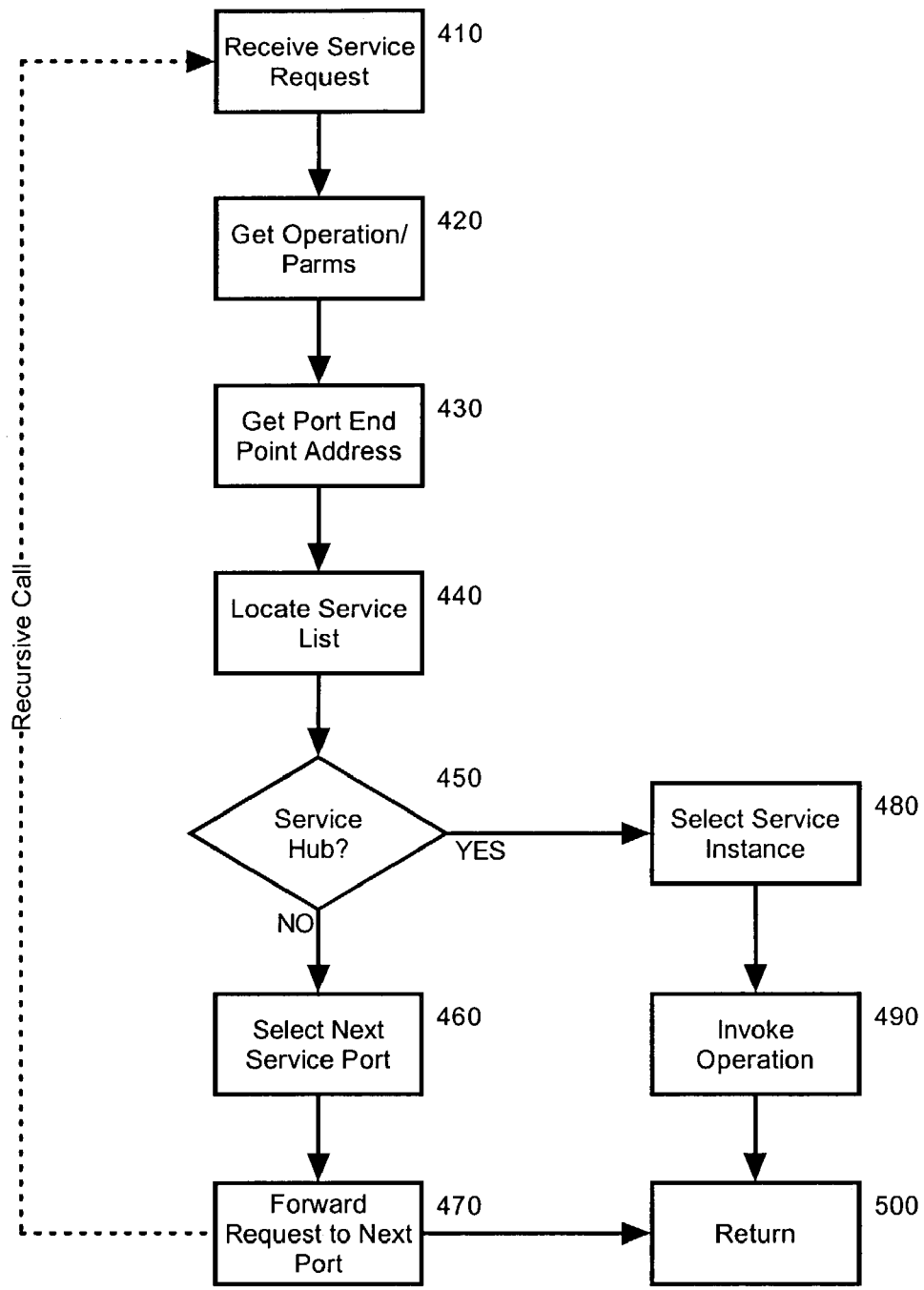

FIG. 4 is a flow chart illustrating a process for non-intrusive nesting and dispatching of service requests in a flattened nested service topology. Beginning in block 410, a service request can be received in a node at any level of the service collection topology. In block 420, the requested operation and associated parameters can be identified from the request. For instance, the user identity, usage level and other qualifying conditions can be identified from the request as passed from a calling application. Using the identified operation and parameters, in block 430 a port end point address can be determined and in block 440, a service list can be located for the identified operation in accordance with any qualifying conditions.

In decision block 450, it can be determined whether the present node is a destination hub so as to indicate that the service instance can be accessed without further passing the request to nodes at lower levels. If not, in block 460 the next service port can be determined from the service policy settings of the present node. Subsequently, in block 470, the process can be recursively called using an interface determined from the service policy settings of the present node. Consequently, the process of blocks 410 through 450 can repeat for the next node.

Notably, in decision block 450 if it is determined that the present node is a destination hub, in block 480, the requested service instance can be selected and in block 490, the requested operation can be invoked within the service instance. Subsequently, in block 500, the recursive process can unwind. Importantly, the aggregation of port types in the nested environment of the present invention can be both "top-down" and "bottom-up" in character. Moreover, caching techniques can be applied within the dispatching process in order to optimize the responsiveness of the dispatching process in processing frequent requests for operations in a service instance in the topology.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. In a service node nested in a service topology, a method for non-intrusively dispatching service requests, the method comprising the steps of:

receiving a service request in the service node and identifying a requested operation and corresponding parameters for said requested operation from said received service request;

obtaining a port end point address for said requested operation and locating a service list for said requested operation;

determining whether the service node is a destination hub;

if it is determined that the service node is a destination hub for said service request, invoking an operation corresponding to said service request; and, if it is determined that the service node is not a destination hub for said service request, selecting a service node at a different level in the service topology and recursively performing said receiving and identifying, obtaining and locating, determining, invoking, and selecting and performing steps in said selected service node.

2. The method of claim 1, further comprising the step of caching each obtained port end point address for use in a subsequent performance of said obtaining step.

3. The method of claim 1, wherein said selecting step comprises the step of selecting a service node at a lower level in the service topology.

4. The method of claim 1, wherein said selecting step comprises the step of selecting a service node at a higher level in the service topology.

5. The method of claim 1, wherein said obtaining step comprises the step of parsing a local service policy to obtain said port end point address for said requested operation.

6. The method of claim 1, wherein said local service policy is defined in an extensible markup language (XML) formatted document.

7. A machine readable storage having stored thereon a computer program for non-intrusively dispatching service requests, the computer program comprising a routine set of instructions for causing the machine to perform the steps of:

receiving a service request in a service node nested in a service topology, and identifying a requested operation and corresponding parameters for said requested operation from said received service request;

obtaining a port end point address for said requested operation and locating a service list for said requested operation;

determining whether the service node is a destination hub;

if it is determined that the service node is a destination hub for said service request, invoking an operation corresponding to said service request; and, if it is determined that the service node is not a destination hub for said service request, selecting a service node at a different level in the service topology and recursively performing said receiving and identifying, obtaining and locating, determining, invoking, and selecting and performing steps in said selected service node.

8. The machine readable storage of claim 7, further comprising the step of caching each obtained port end point address for use in a subsequent performance of said obtaining step.

9. The machine readable storage of claim 7, wherein said selecting step comprises the step of selecting a service node at a lower level in the service topology.

10. The machine readable storage of claim 7, wherein said selecting step comprises the step of selecting a service node at a higher level in the service topology.

11. The machine readable storage of claim 7, wherein said obtaining step comprises the step of parsing a local service policy to obtain said port end point address for said requested operation.

12. The machine readable storage of claim 7, wherein said local service policy is defined in an eXtensible markup language (XML) formatted document.

* * * * *